United States Patent [19]

Sampieri et al.

[11] 4,277,783
[45] Jul. 7, 1981

[54] LIGHT PEN TRACKING METHOD AND APPARATUS

[75] Inventors: Eugene E. Sampieri, Freehold Township, Monmouth County; Thomas P. Sosnowski, Colts Neck, both of N.J.

[73] Assignee: Bell Telephone Laboratories, Incorporated, Murray Hill, N.J.

[21] Appl. No.: 53,916

[22] Filed: Jul. 2, 1979

[51] Int. Cl.³ ............................................. G08B 5/36
[52] U.S. Cl. .................................. 340/708; 340/707; 340/771
[58] Field of Search .................... 340/707, 708; 178/18

[56] References Cited

U.S. PATENT DOCUMENTS

| | | | |
|---|---|---|---|
| 3,337,860 | 8/1967 | O'Hara | 340/707 |
| 3,389,404 | 6/1968 | Koster . | |
| 3,506,875 | 4/1970 | Watanabe et al. | 340/707 X |
| 3,632,865 | 1/1972 | Haskell et al. . | |
| 3,653,001 | 3/1972 | Ninke . | |
| 3,659,281 | 4/1972 | Mori | 340/707 |
| 3,938,137 | 2/1976 | Ngo et al. . | |
| 3,949,391 | 4/1976 | Benjamin . | |
| 4,099,170 | 7/1978 | Maliszowski et al. . | |

Primary Examiner—David L. Trafton
Attorney, Agent, or Firm—Ronald D. Slusky

[57] ABSTRACT

An initial location of a light pen (150) placed on the surface of an ac plasma panel (100) is determined by scanning the panel with a two-step finder mode. In the first step, the display sites of every seventh row of display sites of the panel are caused to flash in groups of sixteen until the pen signals that it has detected a flash. The sites in a 60-by-60 site region (306) of the panel are then caused to flash individually to determine the precise pen location (302). A second pen location (312) is determined by scanning the sites of a 32-by-32 scanning patch (311) centered around the initial pen location. Subsequent pen locations are then predicted based on the most recent and second most recent pen locations. Each predicted location (317) is used to determine where a subsequent 32-by-32 scanning patch (316) is to be positioned. The direction in which the pen is moving determines the order in which the sites of each patch are scanned. As each pen location is determined, a line (313,319) is generated in the displayed image connecting it to the previously-determined pen location. This creates the subjective impression of "writing" with the pen.

32 Claims, 8 Drawing Figures

LIGHT PEN TRACKING METHOD AND APPARATUS

BACKGROUND OF THE INVENTION

The present invention is directed to an improved technique for tracking the position of a light pen across a display surface such as the face of an ac plasma panel.

In many computer-based display systems, the computer is capable of "tracking" the location of a so-called light pen as it is moved across the display surface by a human operator. "Tracking" in this sense means identifying successive closely-spaced points along the pen's path of motion. A display system with this capability can be configured, for example, to provide the operator with the ability of moving a distinctive symbol "or cursor," across the displayed image—a particularly useful tool in such applications as computer-aided design. In other applications continuous curves may be drawn by connecting successive identified pen positions with straight line segments. As long as the distance between the successively-identified positions is small, a relatively smooth, continuous line is generated in the displayed image under the path followed by the pen. This creates the subjective impression that the line was "written" by the light pen.

The strategy employed to track the position of a light pen across the face of a display medium varies with the medium. In cathode ray tube (CRT) systems, for example, the light pen signals the computer the instant that refresh information applied to the CRT causes the phosphor adjacent to the pen tip to emit light. Data identifying the point on the CRT surface being refreshed at any given time is correlated with the light pen signal to identify the location of the pen on the CRT surface. Identification of the pen location in successive scans of the display surface allows the pen location to be tracked over time, and since the entire display surface is typically scanned at 30 frames/second, even very rapid movements of the pen can be followed. See, for example, U.S. Pat. Nos. 3,653,001 issued Mar. 28, 1972 to W. H. Ninke and 3,389,404 issued June 18, 1969 to R. A. Koster.

Other display media may require a different approach. The ac plasma panel, for example, is a display medium comprised of a matrix of individual display sites each of which resides at any given time in one of two possible states—ON (light-emitting, energized) or OFF (non-light-emitting, non-energized). In the ON state, a site emits a train of individual light pulses at a sufficient repetition rate, e.g., 50 kHz, that the site appears to be continuously light-emitting. In contradistinction to the sequential scan operation of a CRT, however, all ON sites of an ac plasma panel emit their light pulses at the same time. Thus, the normal ON site light pulses cannot be used to determine the particular site over which the pen is located. However, an individual site can be "excited," i.e., made to emit a light pulse, when the ON sites are not emitting light. In order to determine the pen location, then, the sites are excited in a predetermined "scanning" sequence. Once the light pen detects a light pulse at a nonstandard time, its location becomes known since the location of the last site to be excited is known. Such an arrangement is shown, for example, in U.S. Pat. No. 4,099,170 issued July 4, 1978 to S. R. Maliszewski et al.

Disadvantageously, it takes a relatively long time to scan all the sites of a plasma panel to search for the light pen. Thus, a light pen tracking arrangement based on such a scanning strategy (in analogy to the CRT arrangements) may be unable to smoothly track even moderate movements of the pen; successively identified pen locations are spaced too far apart, both temporally and spatially. One technique which goes a long way toward solving this problem is taught in U.S. Pat. No. 3,938,137 issued Feb. 10, 1976 to P. D. Ngo et al. Once an initial location of the pen is determined, e.g., by scanning the entire panel, subsequent scans are confined to a small area, or patch, centered at the last known pen location. The underlying theory of this approach is that the pen will not have moved outside of the scanning patch since the last scan. This technique does, in fact, enable the new pen position to be identified much more quickly than when the entire panel is scanned. However, our experience has been that it is still possible for a user to move the pen with sufficient rapidity to cause the pen to "outrun" the patch if the latter is fairly small. The entire panel must then be scanned again, resulting in slow reacquisition of the pen location. It is, of course, possible to simply use a larger patch. However, because more sites must be scanned, the average time needed to locate the pen is increased, resulting in inaccurate tracking of its path.

SUMMARY OF THE INVENTION

Our invention improves upon the above-described scanning patch technique. In accordance with the invention, light pen locations determined during previous scans are used to predict the location of the pen during the upcoming, or future, scan and thus to determine where the scanning patch is to be positioned. In particular, the previous two pen locations are illustratively used to estimate the velocity, i.e., speed and direction, of the pen. The patch is then centered about the location at which the pen would be if it were to continue with that same velocity. This technique allows the patch to be made smaller than in the prior art, substantially decreasing the average time required to identify the new pen location.

In preferred embodiments of our invention and in accordance with a feature thereof, the patch is scanned in a direction substantially opposite to that in which the pen is moving. This, we have found, further decreases the average time required to locate the pen.

DETAILED DESCRIPTION

Figure 1:
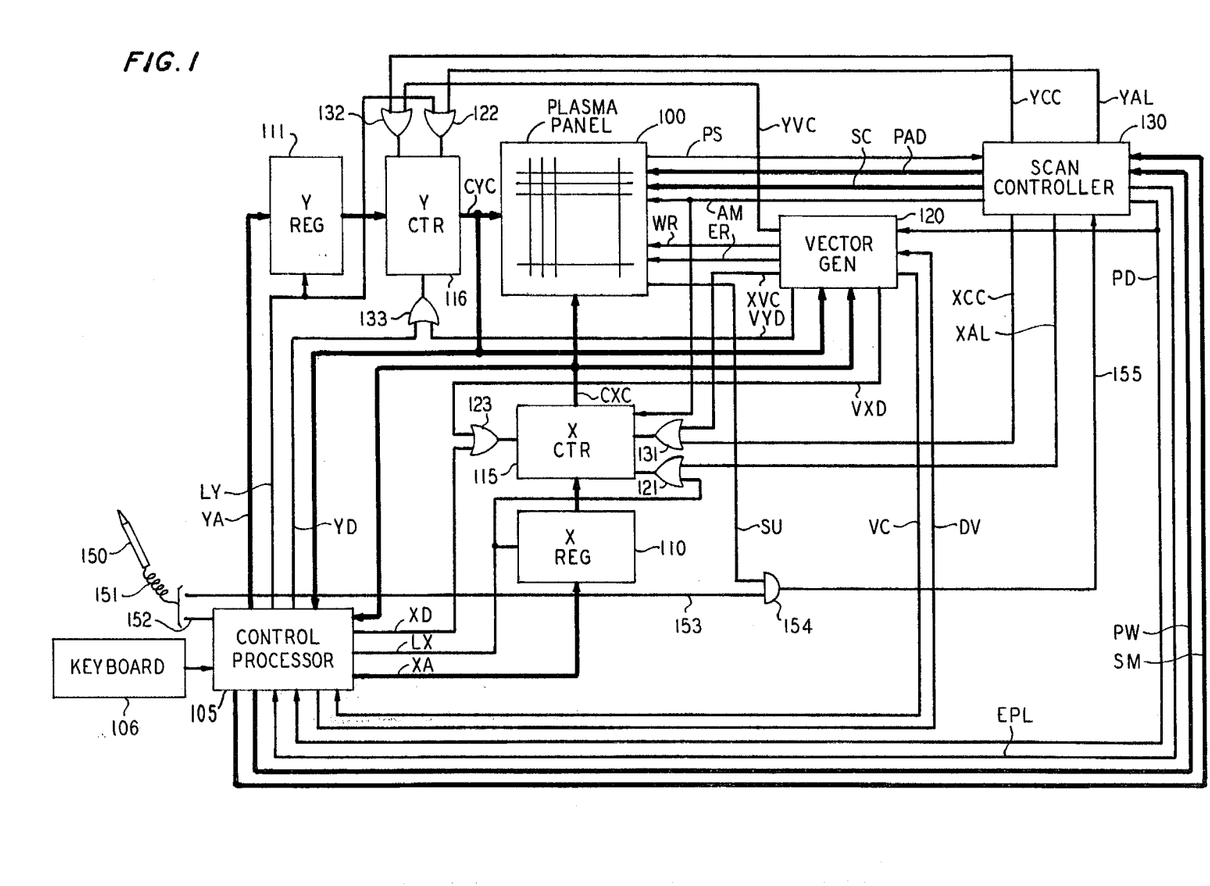
FIG. 1 is a block diagram of a display system embodying the principles of our invention.

FIG. 1 depicts a plasma panel display system embodying the principles of our invention. At the heart of the system is an ac plasma panel 100. Panel 100 is comprised of a matrix of display sites each of which resides in one of two visual states—ON (energized, light-emitting) or OFF (de-energized, non-light emitting).

Figure 2:
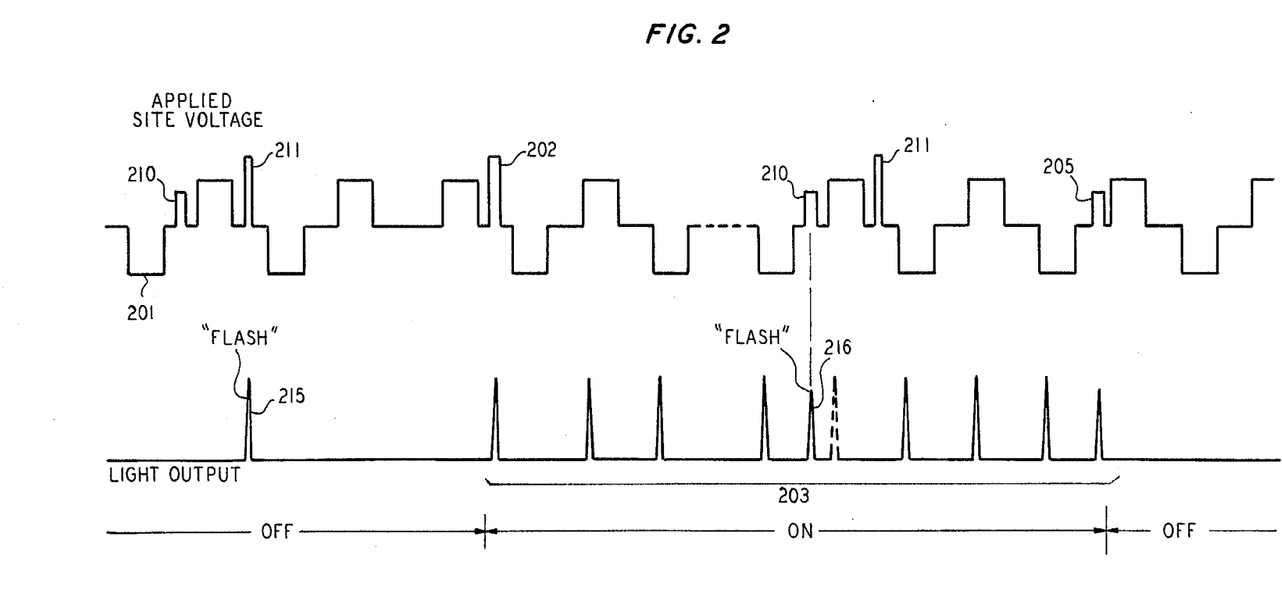
FIG. 2 depicts waveforms helpful in explaining the operation of the system of FIG. 1.

Waveforms helpful in understanding the operation of panel 100 are shown in FIG. 2. A sustain signal comprised of alternating polarity pulses 201 is applied concurrently to all the display sites of the panel. Sites in the OFF state do not respond to pulses 201. However, a site which has been switched to the ON state by "write" pulse 202 will thereafter emit a train of short light pulses 203 in response to the leading edge of each sustain pulse. The sustain signal frequency is on the order of 50 kHz. At this rate, the individual light pulses 203 are integrated by the visual system of the human viewer, giving the subjective impression that the site is continuously light-emitting. The site is returned to the OFF state by an erase pulse 205.

The system of FIG. 1 further includes a light pen 150 and associated circuitry which allow a human operator to, for example, "point" to a particular location on the panel surface. This most simple of light pen functions allows the operator to select items from a menu on the display. For example, a question presented on the display panel by the system may be answered by pointing to one of a number of possible answers (e.g., "yes or no") also presented on the panel. Or, the operator may indicate to the system a desired course of action to be taken by pointing to one of a number of displayed words or phrases identifying the possible alternatives (e.g., "compute", "stop", etc.).

The system of FIG. 1 identifies the location of light pen 150 by applying so-called exciter signals to the sites of panel 100 in a predetermined order—either one site at a time or in groups of several sites. An exemplary exciter signal comprised of a pair of exciter pulses—exciter erase pulse 210 and exciter write pulses 211—is shown in FIG. 2. The effect of applying the exciter signal to a particular site is to cause that site to emit a single light pulse at a time when the ON sites of the panel are between sustain-initiated light pulses. If the site is OFF, the panel responds to pulse 211 and generates a light pulse such as indicated at 215. If the site is ON, it responds to pulse 210 and generates a light pulse such as indicated at 216. If it is known a priori that all the sites of the panel over which pen 150 may be located will all be ON (OFF), the scanning signal need only be comprised of the exciter erase (exciter write) pulse. (The exciter erase and exciter write pulses are described in more detail in U.S. Pat. No. 4,099,170 issued July 4, 1978 to S. R. Maliszewski et al, hereby incorporated by reference, where they are referred to as scan erase and scan write pulses.)

Light pen 150 generates a light pen signal in the form of an electrical pulse when a light pulse occurs adjacent the pen tip. Light pen signals resulting from sustain-initiated light pulses—identified by their time occurrence with respect to the sustain pulses themselves—are ignored. (All ON sites emit their sustain-initiated light pulses at the same time since they receive the same sustain signal.) Once a light pen signal resulting from a exciter-signal-initiated light pulse occurs, the pen location becomes known since the location of the most-recently-scanned site or group of sites is known. In the case where groups of sites are scanned, the sites of the most-recently-scanned group are then scanned individually to identify the precise pen location. A light pulse generated in response to an exciter signal (as opposed to one of pulses 201) is hereafter referred to as a "flash."

The display system of FIG. 1 also provides the more complex function of light pen tracking. Here, the system continuously scans panel 100 as the pen is moved across its surface, the system thereby identifying successive closely-spaced points along the pen's path of motion. This capability is useful in a number of applications. In the illustrative embodiment of FIG. 1, for example, straight lines are generated in the displayed image to connect the successively-identified pen locations, creating the subjective impression that a continuous line was "written" with the pen.

More particularly, the display system of FIG. 1 employs the general tracking technique disclosed in U.S. Pat. No. 3,938,137 issued Feb. 10, 1976 to P. D. Ngo et al. Once an initial location of the pen is determined by scanning the entire panel, subsequent scans are confined to a small area, or "scanning patch," of predetermined size. In the Ngo et al arrangement, the scanning patch is centered at the last known pen location. In accordance with the present invention, by contrast, light pen locations determined during previous scans are used to predict the location of the pen during the upcoming scan. For example, in the present illustrative embodiment the previous two pen locations are used to estimate the velocity, i.e., speed and direction, of the pen to predict its new location. The predicted pen location is then used to determine where the scanning patch should next be positioned. This technique allows the scanning patch to be made smaller than in the prior art because it is based on a more sophisticated evaluation of where the pen is likely to be. Advantageously, the use of a smaller scanning patch substantially decreases the average time required to identify the new pen location. This means that, on average, the distance between successively-identified pen locations is smaller than in the prior art for a given pen speed. The pen path can thus be accurately tracked even when the pen is moved rapidly over the display surface.

Figure 3:
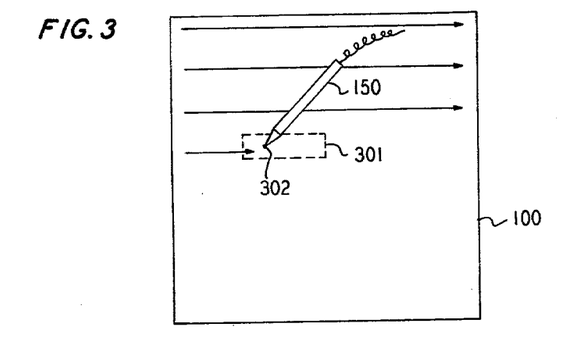
FIGS. 3–7 graphically depict the patch scanning technique of the present invention.

FIGS. 3-7 graphically depict a light pen tracking approach which incorporates the technique of the present invention. As shown in FIG. 3, pen 150 is initially located adjacent to a display site 302. The system identifies the pen location via a two-step "finder" mode. In particular, the position of pen 150 is first determined corasely by scanning every seventh row of sites. Within each scanned row, the sites are scanned in groups of sixteen. The pen field of view is approximately three sites in both the horizontal and vertical directions. (Since every seventh line is scanned, there is some possibility that no scanning-signal-initiated light pulse, or "flash," will be detected by the pen after a first scan of the panel. If this happens, a different set of rows spaced seven apart from each other is scanned until a flash is detected. This approach provides faster determination of the coarse pen position, on average, then scanning every third line, for example. The latter approach would ensure detection of the pen with only one scan of the panel but would require more time to scan the whole panel.) Once the pen signals that it has detected a flash, it is known to be located somewhere within a region 301 which is ten sites high and forty-eight sites wide.

Figure 4:
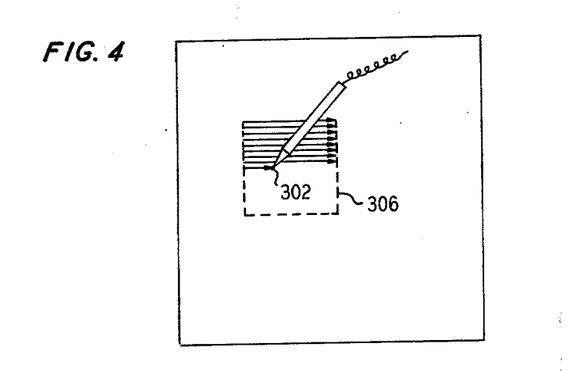

The location of pen 150 is now more precisely determined via the second step of the finder mode in which, at a minimum, the sites of region 301 are scanned individually. In the present implementation, as shown in FIG. 4, a 60-by-60 scanning patch 306 which encompasses region 301 is actually scanned; the use of a square scanning patch simplifies the implementational details.

Figure 5:
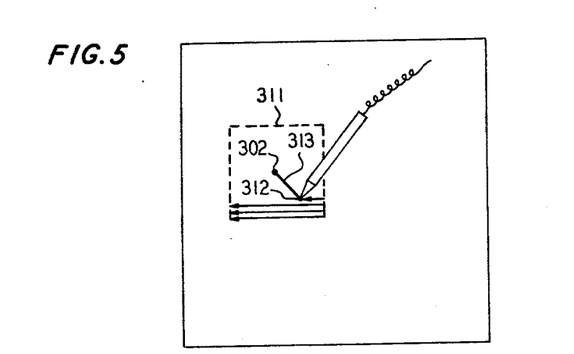

Once the location of the pen adjacent to site 302 has been identified by scanning the patch 306, the system enters its tracking mode. The tracking mode begins with the scanning of a 32-by-32 patch 311 which, as in the above cited Ngo et al patent, is centered about the last-known pen location, i.e., site 302. By this time, the pen is presumed to be moving. Patch 311 is sufficiently large, however, that with normal pen speeds, pen 150 will be located somewhere within the boundaries of that patch—in this example adjacent to site 312. For a reason described in more detail hereinbelow, patch 311 is scanned in the order right to left and bottom to top.

With site 312 identified, the display system generates a line 313 between that site and site 302.

Figure 6:
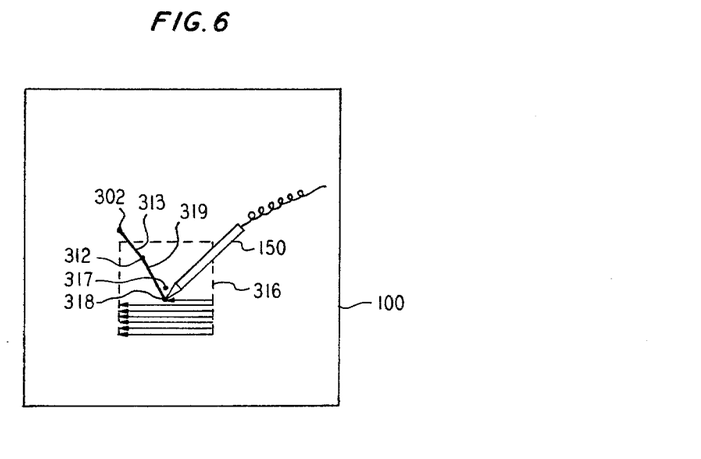

From here on, tracking continues in accordance with the present invention. The location of pen 150 during the next scan is predicted by assuming that the pen will have traveled the same distance and in the same direction that it traveled in moving between sites 302 and 312. This assumption is, in turn, based on the assumptions that the pen is traveling at a constant velocity (speed and direction) and that the time which elapses between the identification of successive pen locations is constant. Neither of these assumptions is necessarily correct. In our experience, however, they are sufficiently accurate to provide a reasonable prediction of where the pen will be located. As shown in FIG. 6, then, pen 150 is predicted to be adjacent to a site 317 which is collinear with sites 302 and 312 and which is the same distance from site 312 as the latter is from site 302.

A 32-by-32 tracking patch 316 centered about the predicted location—site 317—is now scanned. In this example, the pen is actually found to be adjacent to a site 318, which is slightly below predicted site 317. We have found, again, that a 32-by-32 tracking patch is sufficiently large that the pen is assured to be within the tracking patch boundaries with even rapid pen movements.

Tracking continues in the above-described manner for subsequent scans, the last two pen locations being used to predict the upcoming pen location and, thus, to determine where the 32-by-32 tracking patch should next be positioned.

In accordance with a feature of our invention, as also illustrated in FIG. 6, the sites of patch 316 are scanned using a variable scan direction technique. In particular, the sites of patch 316 are scanned in a direction generally opposite to that in which the pen has been moving. Since the pen movement has been down and to the right, patch 316 is scanned from the bottom up and right to left. (If at some later time the pen were to be moving up and to the right, for example, the patch would be scanned from the top down and from right to left.) This approach, we have found, further decreases the time required to identify the pen position.

The fact that patch 311 is scanned from right to left and bottom to top as previously described, is a further implementation of this feature of the invention. The direction of pen travel is not actually known at the time patch 311 is scanned; to that point, only one previous pen location is known. We have observed, however, that, statistically, a human operator tends to begin moving the pen down and to the right.

(The variable scan direction technique may be defined as follows: The order in which the lines comprising the patch are scanned is such that each successive one of the lines is successively closer to the more recent one of the two previously-determined pen locations. This is illustratively shown in FIG. 6 wherein each successive horizontal scan line beginning at the bottom of patch 316 and extending to the left is closer to site 312, the more recent one of the two previously-determined pen locations—sites 302 and 312. Likewise, if the patch is vertically scanned, as illustratively shown in FIG. 7, each successive vertical scan line beginning at the right of patch 316 and extending to the top will also be closer to site 312, the more recent one of the two previously-determined pen locations. Moreover, if one considers a vector from the less recent to the more recent of the two previously-determined pen locations, each scan line is scanned in a direction opposite to that defined by a component of that vector parallel to the scan lines.)

The above-described scan direction technique exhibits a disadvantageous side-effect in applications, such as in the embodiment of FIG. 1, in which the pen is used to "write" on the panel. As the pen is moved in a generally straight line, such as horizontally, small pen deviations from that line, i.e., in the vertical direction, may cause the scanning patch to be scanned from alternate sides, e.g., from the top and then from the bottom, in successive scans. Since the pen field of view encompasses a group of sites, the site at which a flash is first detected will alternately be near the top and then near the bottom of the pen field of view. The result is that the line "written" on the panel is wavy, rather than straight.

In accordance with an aspect of the invention, this problem is ameliorated by precluding a horizontal (vertical) scan direction change unless the difference between the horizontal (vertical) coordinates of successively-identified pen locations meets some minimum. We have found, in particular, that requiring a four-site minimum distance for scan direction change adequately suppresses the wavy line problem without noticeably lessening the effectiveness of the variable scan direction technique itself.

In the same vein, and in accordance with another aspect of the invention, the pen is assumed to have zero horizontal (vertical) velocity for purposes of predicting its upcoming location if the actual movement in the horizontal (vertical) direction between successive scans is less than some-minimum—again illustratively four sites.

Figure 7:
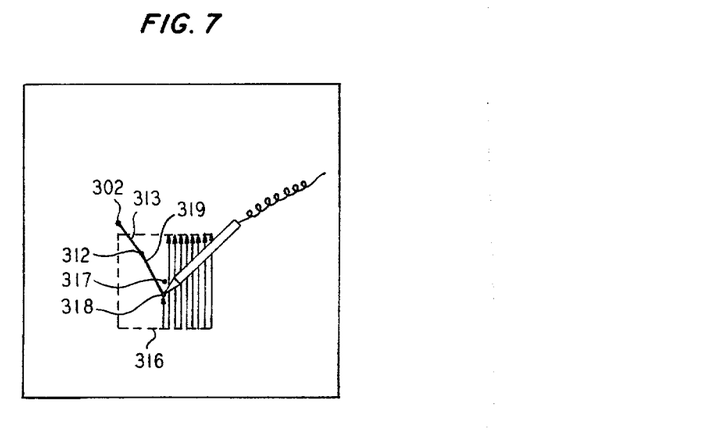

The above description has tacitly proceeded on the assumption that patch 316 is always scanned with horizontal scan lines. We believe, however, that the average time required to identify the pen location can be decreased even further by selecting the orientation of the scan lines as a function of whether the pen is moving faster in the vertical or horizontal direction. In particular, if pen 150 is moving faster in the vertical direction, path 316 should be scanned with horizontal scan lines, as in FIG. 6. If, on the other hand, the pen is moving faster in the horizontal direction, the patch should be scanned with vertical scan lines, as illustrated in FIG. 7.

In either event, a line 319 is drawn between sites 312 and 318. Scanning then proceeds in the manner described above in accordance with the invention until the pen is lifted from the surface of the panel.

Returning now to FIG. 1, the display system is seen to further include a control processor 105 and associated keyboard 106, X and Y registers 110 and 111, X and Y counters 115 and 116, vector generator 120 and scan controller 130. These components are interconnected by a number of signaling leads. Some of these, represented by the lighter lead lines, are comprised of a single conductor. The others, represented by the darker lead lines, are comprised of a plurality of conductors.

The operation of the system of FIG. 1 to provide the above-described light pen tracking is as follows: When pen 150 is first placed on the surface of panel 100, control processor 105 receives a signal to that effect via lead 152 of cord 151. Processor 105 then initiates the first step of the finder mode (FIG. 3) by providing the X and Y addresses of the first site to be scanned onto leads XA (X Address) and YA (Y Address). The X and Y addresses of the first site to be scanned—illustratively the site in the upper left corner of panel 100—are both "0". Pulses on leads LX (Load X) and LY (Load Y) now cause the addresses on leads XA and YA to be loaded into registers 110 and 111, respectively. The X and Y addresses, in addition to being loaded into registers 110 and 111, are also extended therethrough to X and Y counters 115 and 116 into which they are also loaded in response to the load signals on leads LX and LY. In particular, the load signals are applied to counters 115 and 116 via OR gates 121 and 122, respectively. The addresses in counters 115 and 116 are extended to panel 100 via leads CXC (Current X Count) and CYC (Current Y Count).

Processor 105 also provides a signal on lead PW (Patch Width) indicating to scan controller 130 how many times panel 100 is to receive an exciter signal in each row of sites. It will be recalled that in the first step of the finder mode, sixteen sites at a time receive the exciter signal. Since there are 512 sites in a row, the number provided on lead PW at this time is 512/16=32, represented, as are all numbers used in the system, in binary form.

Processor 105 also provides a multibit scan mode signal on lead SM. This signal indicates to scan controller 130 whether scanning is to be carried out using exciter write pulses, exciter erase pulses, or both. That choice, in turn, would have been made by the human operator and indicated to processor 105 from keyboard 106. The scan mode signal also indicates to scan controller 130 whether the panel is to be operated with so-called parallel addressing, i.e., sixteen sites scanned at once—as is the case in the first step of the finder mode—or with serial addressing, i.e., one site at a time. The data on lead SM indicating whether scanning is to be carried out using exciter write pulses, exciter erase pulses or both, is extended by scan controller 130 to panel 100 via lead SC (Scan Control). The data on lead SM indicating whether the panel is to be operated with parallel or serial addressing is extended to the panel via lead AM (Addressing Mode).

When panel 100 is operated with parallel addressing, any one or more of the sixteen sites in question—those sixteen sites being the site identified by the X and Y addresses in counters 115 and 116 and the fifteen sites to its right—can be addressed. A 16-bit word on lead PAD (PAralled Data) extending from controller 130 to panel 100 indicates to the latter which of the sixteen sites is, in fact, to be addressed. In the present example, all sixteen sites are to receive the selected exciter signal. Thus lead PAD carries sixteen "1"'s at this time.

Upon receiving the above-described signals on leads PAD, AM and SC, panel 100 initiates the flashing of the sixteen sites in question and at the same time extends a binary "1" back to controller 130 via leads PS (Panel Status). That "1" indicates that the panel has received the signals applied to it and is currently acting upon them by flashing the appropriate sites. Controller 130 responds to the "1" on lead PS by removing the signal on lead SC, the signals on leads AM and PAD remaining as they were. After the sites have been flashed, panel 100 returns lead PS to "0".

Assuming no flash was detected by pen 150, controller 130 responds to the "0" on lead PS by generating a pulse on lead XCC (X Count Clock). The latter extends to counter 115 via OR gate 131 and causes the address in counter 115 to be advanced. In particular, the signal now on lead AM indicates to counter 115 that the system is in the first step of the finder mode and that, therefore, the counter should respond to the pulse on lead XCC by advancing the address therein by sixteen. (This amounts to routing the pulse on lead XCC to the fifth-least-significant stage of the counter.) The signal on lead SC is then reapplied by controller 130, causing the next group of sixteen sites to be flashed. This process repeats for a total of thirty-two times, marking the end of the scanning of the first row of sites.

At this point, scan controller 130 provides a signal on lead EPL (End of Patch/Line) back to control processor 105, it being assumed that no flash has yet been detected by pen 150. Processor 105 responds by loading new addresses into counters 115 and 116 via registers 110 and 111. The address loaded into X counter 115, in particular, is again "0". The address now loaded into Y counter 116 is greater by seven than its previous address. In this case, then, the address "7" is loaded into counter 116.

The scan mode signals are now reapplied to lead SM and the above process is repeated for a new row of the panel and, thereafter, for each successive seventh row until a flash is detected by pen 150. If no flash has been detected once the entire panel has been scanned in this every-seventh-row manner, pen 150 is assumed to be located between two of the rows scanned. In this event, scanning of every seventh row of the panel begins again, except now starting with the third or fourth row, rather than the first.

In any event, controller 130 terminates scanning immediately upon receiving a signal that a flash was detected. That signal is generated by AND gate 154 in response to (a) a signal from pen 150 via lead 153 that a light pulse was detected by the pen, gated with (b) a signal from panel 100 on lead SU (Sustain). The latter carries a "0" during each sustain pulse 201, thereby precluding controller 130 from responding to sustain-initiated light pulses. At this time controller 130 also signals control processor 105 via lead PD (Pen Detect). Processor 105 responds by reading in the address currently on leads CXC and CYC.

The second step of the finder mode (FIG. 4) now begins. Processor 105 loads into counters 115 and 116 the X and Y addresses of the site located in the upper left corner of the 60-by-60 finder mode scanning patch 306. The X (Y) address of that site is equal to the X (Y) address read in from lead CXC (CYC) less the number 30. Since scan controller 130 will be generating sixty individual scan commands on lead SC for each row scanned, the number 60 is now provided on lead PW and lead SM now indicates that scanning is to be performed with serial addressing.

Scan controller 130 now operates as before except that lead AM indicates to panel 100 that serial addressing is to be used. The site in the upper left corner of patch 306 is thus caused to flash. With lead AM now indicating the serial adddressing mode, counter 115 responds to each pulse on lead XCC by advancing the address therein by unity. If pen 150 has not detected a flash by the time the first row of patch 306 has been fully scanned, controller 130 pulses X counter 115 via lead XAL (X Address Load) and OR gate 121. This causes the X address in register 110 to be loaded once again into counter 115. Controller 130 also pulses Y counter 116 via lead YCC (Y Count Clock) and OR gate 132, causing an advance of the address in the Y counter by unity.

The system is thus readied to scan the second row of patch 306, which action now begins. If pen 150 still detects no flash, counters 115 and 116 are again reset and advanced, respectively, and the third row of patch 306 is scanned. The process continues for each other row of patch 306 until the flash at site 302 is detected. (In the rare event that no flash is detected, as would be indicated by a signal on lead EPL, processor 105 causes the entire patch 306 to be rescanned.) When the pen detect signal appears on lead PD, processor 105 again reads in the addresses on leads CXC and CYC.

The tracking mode now begins. Control processor 105 loads into counters 115 and 116 to X and Y addresses of the site located in the lower right corner of 32-by-32 patch 311 (FIG. 5). The X (Y) address of that site is equal to the X (Y) address read in from lead CXC (CYC) plus the number 16. The number on lead PW is now 32.

The addresses in counters 115 and 116 have, to this point in the operation of the display system, always been advanced, i.e., increased in value. However, since scanning of patch 311 proceeds right to left and bottom to top, each pulse on leads XCC and YCC must now decrease the addresses in those counters. To this end, counters 115 and 116 are provided with up/down counting capability. The count direction of counter 115 is controlled by processor 105 via lead XD (X Direction) and OR gate 123; the count direction of counter 116 is controlled via lead YD (Y Direction) and OR gate 133.

Once the parameters relating to the scanning of patch 311 are established, as just described, the operation controller 130 in scanning patch 311 proceeds in a manner similar to the scanning of patch 306 until the second pen location—site 312—is identified. In response to the pulse on lead PD, which is again provided when a flash is detected, processor 105 not only reads in the addresses on leads CXC and CYC, but also pulses vector generator 120 via lead DV (Draw Vector).

The function of vector generator 120 is to draw straight lines in the displayed image between the two most-recently-determined pen locations, e.g., lines 313 and 319. At the operator's option, as indicated from keyboard 106, the sites of panel 100 may be all initially OFF or all initially ON, with the line drawn by vector generator 120 being formed by energizing sites, in the former case, or de-energizing them in the latter case. The X and Y addresses of the site adjacent to which pen 150 was most recently located—site 312—are still stored in counters 115 and 116. Assuming in this example that a bright line is to be written on a dark background, vector 120 generates a write pulse on lead WR, thereby energizing that site. (In the case of a dark line on a bright background, an erase pulse would be generated on lead ER instead.)

Vector generator 120, like processor 105, receives the signals on lead PD as well as the addresses on leads CXC and CYC. The addresses of the two most-recently-determined pen locations—sites 302 and 312—are currently stored in the vector generator. The difference between the two stored X addresses and the differences between the two stored Y addresses are individually formed within vector generator 120. The sign of the X address difference controls the direction of count for counter 115 via lead VXD (Vector X Direction) and OR gate 123. The sign of the Y address difference controls the direction of count for counter 116 via lead VYD (Vector Y Direction) and OR gate 133.

The quotient of the Y address difference to the X address difference is also formed within the vector generator. That quotient is reduced to the quotient M/N, M and N being integers having no common factors. The quotient M/N will be recognized as the slope of line 313. Vector generator 120 thus generates the X address of the second site in line 313 by extending N pulses to X counter 115 via lead XVC (X Vector Clock) and OR gate 131, thereby incrementing or decrementing by N (as determined by the signal on lead VXD) the address in the X counter. At the same time, vector generator 120 generates the Y address of the second site in line 313 by extending M pulses to Y counter 116 via lead YVC and OR gate 132, thereby incrementing or decrementing the address therein by M, as determined by the signal on lead VYD. Once counters 115 and 116 hold the new X and Y addresses, a second write pulse is generated on lead WR. The addresses in counters 115 and 116 are then again incremented or decremented by N and M, respectively, and so forth. When line 313 has been entirely formed, vector generator 120 signals processor 105 via lead VC (Vector Complete).

While vector generator 120 has been generating line 313, processor 105 has been determining the starting point and scanning direction for patch 316. (This process is described in more detail in conjunction with FIG. 8.) Upon receiving the signal from vector generator 120 on lead VC, processor 105 loads the X and Y addresses of the site in the lower right corner of patch 316 into registers 110 and 111 and counters 115 and 116. Processor 105 also provides the appropriate up/down signals on leads XD and YD as well as the appropriate patch width which is (still 32) on lead PW and the appropriate scan mode signals on lead SM. The entire process of scanning and line-drawing thus continues for patch 316 and, indeed, indefinitely until pen 150 is lifted from the panel. The capability of scanning with both horizontal and vertical scan lines, as previously described in connection with FIG. 7, is incorporated into the system of FIG. 1 by providing (a) another conductor within lead SM by which processor 105 indicates whether the scan lines are to be horizontal or vertical in accordance with the above-described criterion, and (b) a lead YAL (Y Address Load) from scan controller 130 to counter 116 via OR gate 122. In order to scan with vertical scan lines, scan controller 130 need only interchange the above-described signals on leads XCC and YCC and to transfer to lead YAL the above-described signal provided on lead XAL.

Control processor 105, vector generator 120 and scan controller 130 can be realized in any of various ways which will be apparent to those skilled in the art. Each of these units can be realized, for example, with conventional digital circuit building blocks, such as flip-flops, counters and Boolean logic elements. Alternatively, the function of any one or more of them could be provided by individual microprocessors. The advantage of using several microprocessors and/or digital circuits to perform the above-described tasks rather than using one microprocessor to do them all is that it allows several operations to be performed at once. For example, line drawing by vector generator 120 can be performed concurrently with the determination of the new scanning patch position in processor 105.

Figure 8:
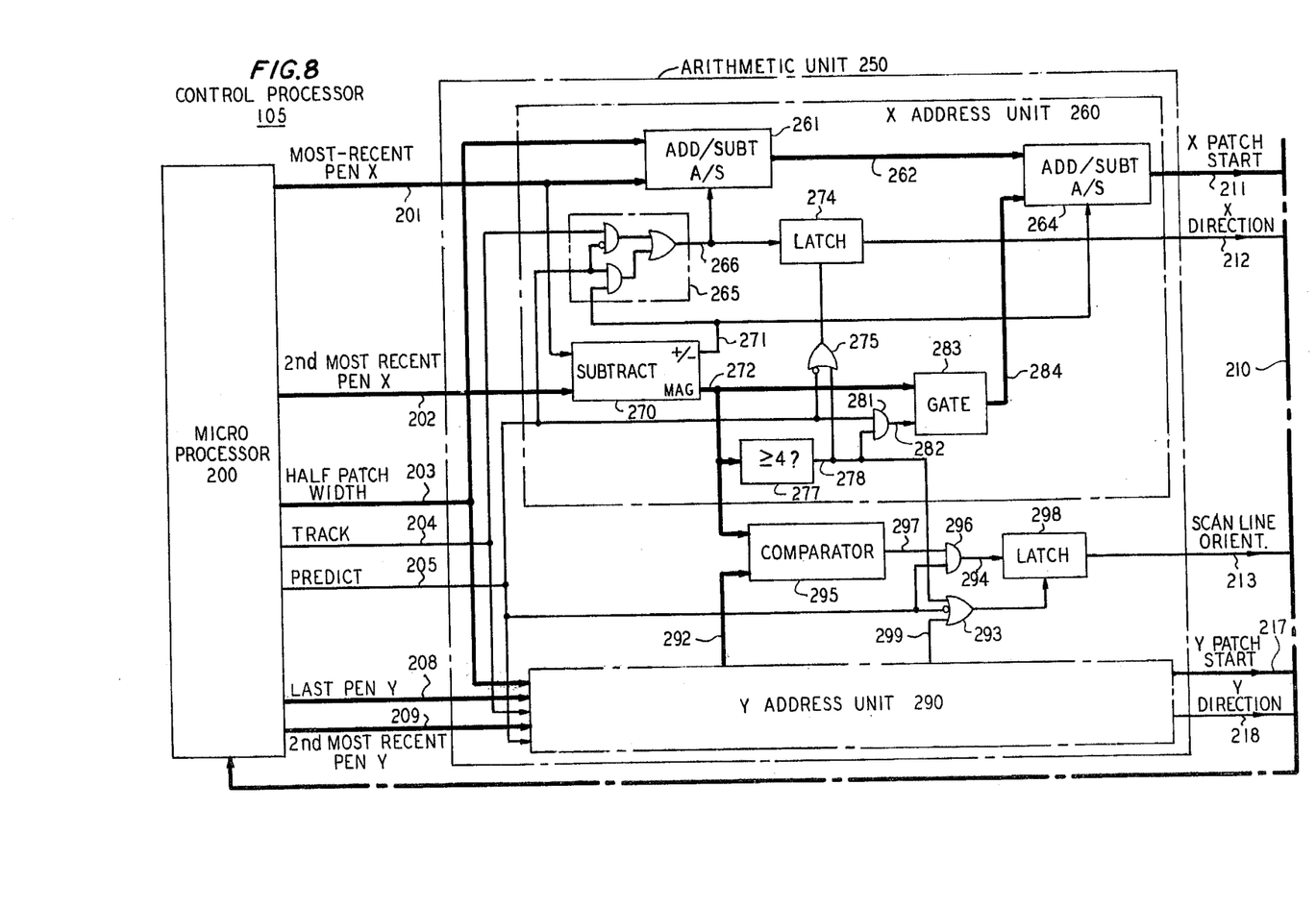
FIG. 8 is a block diagram of an illustrative control processor for use in the display system of FIG. 1.

In an embodiment of the invention which was actually built, processor 105 was realized with a microprocessor. FIG. 8, however, shows an alternative embodiment of processor 105 comprised of a microprocessor 200 and an arithmetic unit 250. The latter operates under the control of the former to perform the specialized tasks of determining (a) the initial site of each scanning patch to be scanned and (b) the scanning directions within the patch.

Arithmetic unit 250, more particularly, includes X and Y address units 260 and 290, respectively. A number representing the magnitude of half the current patch width is provided to both the X and Y address units on lead 203. Also provided to both address units is a signal on predict lead 205 indicating whether the patch about to be scanned is to be centered about the most recent pen location—as in the second step of the finder mode and the first step of the tracking mode—or is to be centered about a predicted pen location in accordance with the present invention. In addition, a signal on lead 204 indicates to both address units whether the system is in the finder mode or tracking mode. The addresses of the most recent and the second most recent pen locations are extended from microprocessor 200 to X address unit 260 via leads 201 and 202. The Y addresses of those two pen positions are similarly extended to Y address unit 290 via leads 208 and 209.

Address units 260 and 290 each extend two outputs to microprocessor 200. The X (Y) address of the first site of the patch to be scanned is provided on X (Y) patch start lead 211 (217). The direction in which the patch is to be scanned along the X (Y) axis is indicated on X (Y) direction lead 212 (218). Leads 211, 212, 217 and 218 extend back to microprocessor 200 via cable 210.

Arithmetic unit 250 also includes a comparator 295 and associated circuitry as described below. This arrangement is responsive to the signal on lead 205 as well as to signals provided from address units 260 and 290 to indicate to microprocessor 200 via lead 213 and cable 210 whether the scan lines are to be oriented horizontally or vertically.

The structure and operation of address units 260 and 290 are similar to one another. Thus, only the former will be discussed in detail. Assume, in particular, that the system is about to begin the second step of the finder mode (FIG. 4). Lead 204 carries a "0", indicating the finder mode. Lead 205 also carries a "0", indicating that the scanning patch is to be centered about the most recent pen position. The signals on leads 204 and 205 are received by logic circuit 265 which responds by extending a "0" to the A/S (add/subtract) input of an adder/subtractor 261 via lead 266. Adder/subtractor 261 responds to the "0" on lead 266 by subtracting the number on lead 203 (which is 30 at this time) from the address on lead 201. The output of adder/subtractor 261 on lead 262 represents the X address of the upper left corner of patch 306. The "0" on lead 205 also extends to one input of AND gate 281. The output of the latter on lead 282 is thus "0", causing the output of gate 283 on lead 284 to be "0". Lead 284 extends to an adder/subtractor 264. The latter adds the number on lead 284 to, or subtracts it from, the address on lead 262, depending on signal on lead 271 (as described below). Since lead 284 carries a "0" at this time, the output of adder/subtractor 264 on lead 211 is equal to the address on lead 262.

The "0" on lead 205 also extends to AND gate 296, and to respective inverting inputs of OR gates 275 and 293. The resulting "1"'s at the outputs of gates 275 and 293 enable latches 274 and 298 to read in the "0"'s on leads 266 and 294, respectively, the latter being the output lead of gate 296, A "0" thus appears on lead 212, indicating that patch 306 is to be scanned from left to right. A "0" also appears on leads 213, indicating that horizontal scan lines are to be used.

When the tracking mode begins (FIG. 5), the signal on lead 204 becomes "1" and the number on lead 203 becomes 16. Lead 205 still carries a "0", however. Lead 266 now carries "1". This causes the number on lead 203 to be added to, rather than subtracted from, the address on lead 201. In addition, the bit in latch 274, and thus on lead 212, becomes "1" since latch 274 is enabled to enter in the new bit on lead 266. The result, as desired, is right to left, bottom to top scaning of patch 311. Lead 284 still carries a "0" so that patch 311 is centered about point 302. Lead 294 still carries a "0" so that a "0" is still stored in latch 298. The "0" on lead 213 thus continues to indicate that horizontal scan lines are to be used.

For subsequent determinations of patch starting point and scanning directions—which determinations are made in accordance with the present invention—both leads 204 and 205 carry "1"'s. Circuitry incuding subtractor 270 and comparator 277 now comes into play. In particular, subtractor 270 subtracts the address on lead 202 from that on lead 201. It provides a bit on lead 271 indicating the sign of the difference and a signal on lead 272 indicating the magnitude thereof. As the result of the "1"'s on both of leads 204 and 205, the sign bit on lead 271 passes unchanged through logic circuit 265 to lead 266. Adder/subtractor 261 is thus operated to add or subtract the number on lead 203 from the address on lead 201 as a function of the direction in which the pen is moving. However, as long as the magnitude on on lead 272 is at least "4", comparator 277 provides a "1" on lead 278. That "1" causes latch 274 to be enabled via gate 275 and the bit on lead 266 is entered into the latch. The X direction signal on lead 212 is thus generated on the basis of the direction of pen motion in the horizontal direction.

The "1" on lead 278 also causes the output of gate 281 on lead 282 to be "1". Accordingly, gate 283 is enabled to pass the magnitude on lead 272 through to adder/subtractor 264, where it is added to, or subtracted from, the address on lead 262, depending on the sign bit on lead 271. In this way the address on lead 211 is, indeed, the X address of the site in the lower right corner of patch 316.

If, contrary to what has been assumed above, the difference on lead 272 were to be less than "4", gate 283 and latch 274 would not be enabled. The patch would then be centered at its most recent position, rather than at a prediction position, and would be scanned in the direction indicated by the sign bit last entered into latch 274.

Comparator 295 compares the magnitude of the signal on lead 272 with the magnitude of the signal on the corresponding lead 292 in Y address unit 290. The output of comparator 295 on lead 297 indicates which of those signals is the larger, and thus whether the pen is moving faster in the horizontal or vertical direction. Lead 297 extends to AND gate 296. Since lead 205 now carries "1", the output of gate 296 on lead 294 is determined by the bit on lead 297. The signals on lead 278 and the corresponding lead 299 in Y address unit 290 are extended to OR gate 293. Thus, as long as the pen has moved at least four sites in either the horizontal or vertical direction, latch 298 is enabled to read in the current bit on lead 294. The scan line orientation is thus determined by whether the pen is moving faster in the horizontal or vertical direction, as previously described. If, on the other hand, the pen has not moved at least four sites in the horizontal nor in the vertical direction, latch 298 will not be enabled to read in the bit on lead 294. The scan line orientation will then be whatever it was for the previous patch.

Although a specific implenetation of our invention is shown and described herein, other arrangements are possible. For example, it is anticipitated that using three (or more) previous pen locations to predict its future location via an estimate of the pen acceleration (and derivatives thereof) may provide an even more accurate prediction, allowing the use of a smaller scanning patch and thus further reducing the average time needed to locate the pen.

Thus, it will be appreciated that numerous arrangements embodying the principles of the invention may be devised by those skilled in the art without departing from their spirit and scope.

We claim:

1. A method for use in a display system which includes a display medium (100) comprised of a plurality of selectively energizable display sites, means (105, 110, 111, 115, 116, 130) for causing selected ones of said display sites to flash in a selected order, a light pen (150) adapted to be moved adjacent to said display medium, said light pen generating a signal when a display site adjacent thereto flashes, and means (105, 115, 116, 130, 154) responsive to said signal for identifying as the current location of said light pen the location of said adjacent display site, said method being comprised of the step of
selecting as said ones of said display sites the display sites in a region of said display medium which includes a predicted future location of said pen.

2. The invention of claim 1 wherein in said selecting step said region is centered about said predicted future location.

3. The invention of claims 1 or 2 wherein in said selecting step said future location is predicted to be along the line defined by two previous locations of said pen.

4. The invention of claim 3 wherein in said selecting step said future location is predicted to be substantially the same distance from the more recent one of said two previous locations as said two previous locations are from each other.

5. The invention of claim 4 wherein said method includes the further step of selecting said order as a function of the direction in which said more recent one of said two previous locations lies with respect to the less recent one of said two previous locations.

6. The invention of claims 1 or 2 wherein said selecting step includes the step of predicting from at least two previous locations of said pen the distance and direction of said future location from the more recent one of said two previous locations.

7. The invention of claim 6 wherein said predicting step is comprised of the step of predicting as said distance and direction the distance and direction of said more recent one of said two previous locations from the less recent one of said two previous locations.

8. The invention of claim 6 wherein said method includes the further step of selecting said order as a function of the direction in which said more recent one of said two previous locations lies with respect to the less recent one of said two previous locations.

9. A method for use in a display system which includes a display medium (100), a light pen (150) adapted to be moved adjacent to the surface of said display medium and means (105, 110, 111, 115, 116, 130) operative for scanning said display medium to determine the location of said light pen, said method comprising the step of
operating said scanning means to scan the sites in a region of said display medium which includes a predicted future location of said light pen.

10. The invention of claim 9 wherein in said operating step said region is centered about said predicted future location.

11. The invention of claims 9 or 10 wherein in said operating step and future location is predicted to be along the line defined by two previous locations of said light pen.

12. The invention of claim 11 wherein in said operating step said future location is predicted to be at substantially the same distance from the more recent one of said two previous locations as said two previous locations are from each other.

13. The invention of claim 12 wherein in said operating step the sites of said region are scanned in a plurality of scan lines such that each successive one of said lines is successively closer to said more recent one of said two previous locations.

14. The invention of claims 9 or 10 wherein said operating step includes the step of estimating the speed and direction of the motion of said pen.

15. The invention of claim 14 wherein in said operating step the sites of said region are scanned in a plurality of scan lines parallel to a first component of a vector from the less recent one of said two previous locations to the more recent one of said two previous locations and wherein each of said lines is scanned in a direction opposite to that defined by said first component.

16. The invention of claim 15 wherein the order in which said lines are scanned is such that each successive one of said lines is successively closer to said more recent one of said two previous locations.

17. A display system which includes
a display medium (100) comprised of a plurality of selectively energizable display sites,
control means (105, 110, 111, 115, 116, 130) for causing selected ones of said display sites to flash in a selected order,
a light pen (150) adapted to be moved adjacent to said display medium, said light pen generating a signal when a display site adjacent thereto flashes, and means (105, 115, 116, 130, 154) responsive to said signal for identifying as the current location of said light pen the location of said adjacent display site, said control means characterized by means (260, 290) for selecting as said ones of said display sites the display sites in a region of said display medium which includes a predicted future location of said pen.

18. The invention of claim 17 wherein said selecting means is comprised of means for selecting said ones of said sites such that said region is centered about said predicted future location.

19. The invention of claims 17 or 18 wherein said predicted future location is along the line defined by two previous locations of said pen.

20. The invention of claim 19 wherein said predicted future location is substantially the same distance fromd the more recent one of said previous locations as said two previous locations are from each other.

21. The invention of claim 20 wherein said control means is further characterized by means (264, 270, 274) for selecting said order as a function of the direction in which said more recent one of said two previous locations lies with respect to the less recent one of said two previous locations.

22. The invention of claims 17 or 18 wherein said control means is further characterized by means (270) for predicting from at least two previous locations of said pen the distance and direction of said future location from the more recent one of said two previous locations.

23. The invention of claim 22 wherein said predicting means is comprised of means for predicting as said distance and direction the distance and direction of said more recent one of said two previous locations from the less recent one of said two previous locations.

24. The invention of claim 23 wherein said control means is further characterized by means (270, 274) for selecting said order as a function of the direction in which said more recent one of said two previous locations lies with respect to the less recent one of said two previous locations.

25. A display system which includes,
a display medium (100), a light pen (150) adapted to be moved adjacent to the surface of said display medium and means (105, 110, 111, 115, 116, 130) for scanning a selected region of said display medium to determine the location of said light pen, said scanning means characterized by
means (260, 290) for selecting as said region a region of said display medium which includes a predicted future location of said light pen.

26. The invention of claim 25 wherein said selected region is substantially centered about said predicted future location.

27. The invention of claims 25 or 26 wherein said future location is predicted to be along the line defined by two previous locations of said light pen.

28. The invention of claim 27 wherein said future location is predicted to be at substantially the same distance from the more recent one of said two previous locations as said two previous locations are from each other.

29. The invention of claim 28 wherein said scanning means includes means for scanning said region in a plurality of scan lines parallel to a first component of a vector from the less recent one of said two previous locations to the more recent one of said two previous locations and wherein each of said lines is scanned in a direction opposite to that defined by said first component.

30. The invention of claim 29 wherein said scanning means further includes means for scanning said region such that each successive one of said lines is successively closer to said more recent one of said two previous locations.

31. The invention of claims 25 or 26 wherein said scanning means is further characterized by means (270) for estimating the speed and direction of the motion of said pen.

32. The invention of claim 27 wherein said scanning means includes means for scanning said region in a plurality of scan lines such that each successive one of said lines is successively closer to the more recent one of said two previous locations.

* * * * *